(12) United States Patent
Gerardin et al.

(10) Patent No.: US 9,708,215 B2
(45) Date of Patent: Jul. 18, 2017

(54) SUBSTRATE PROVIDED WITH A MULTILAYER COATING HAVING THERMAL PROPERTIES, WHICH INCLUDES HIGH-REFRACTIVE-INDEX LAYERS

(75) Inventors: Hadia Gerardin, Paris (FR); Vincent Reymond, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1233 days.

(21) Appl. No.: 13/254,513

(22) PCT Filed: Mar. 8, 2010

(86) PCT No.: PCT/FR2010/050391
§ 371 (c)(1),
(2), (4) Date: Oct. 11, 2011

(87) PCT Pub. No.: WO2010/103224
PCT Pub. Date: Sep. 16, 2010

(65) Prior Publication Data
US 2012/0028009 A1    Feb. 2, 2012

(30) Foreign Application Priority Data

Mar. 9, 2009 (FR) ...................... 09 51458

(51) Int. Cl.
*B32B 7/02* (2006.01)
*C03C 17/36* (2006.01)
(Continued)

(52) U.S. Cl.
CPC ............... *C03C 17/36* (2013.01); *B32B 7/02* (2013.01); *B32B 17/10229* (2013.01);
(Continued)

(58) Field of Classification Search
CPC ... C03C 17/36; C03C 17/3626; C03C 17/366; C03C 17/3644; C03C 17/3411–17/3435;
(Continued)

(56) References Cited

U.S. PATENT DOCUMENTS 3,901,997 A    8/1975 Groth
5,837,361 A    11/1998 Glaser et al.
(Continued)

FOREIGN PATENT DOCUMENTS

DE    197 51 711    5/1999
WO    WO2007/101964 A1 *    9/2007

OTHER PUBLICATIONS

Dobrowolski, J.A. "Optical Properties of Films and Coatings". Handbook of Optics: vol. I, Fundamentals, Techniques, and Design, (1995); pp. 42.3-42.130.*
Baco et al. "Study on Optical Properties of Tin Oxide Thin Films of Different Annealing Temperatures". Journal of Science and Technology, Malaysia, (2012); pp. 61-72.*
"How is tempered glass made?". Scientific American, http://www.scientificamerican.com/article/how-is-tempered-glass-mad/, (2001); pp. 1-3.*
(Continued)

*Primary Examiner* — Prashant J Khatri
(74) *Attorney, Agent, or Firm* — Oblon, McClelland, Maier & Neustadt, L.L.P.

(57) ABSTRACT

A transparent glass substrate including on a main face a thin-film multilayer coating including a metallic functional layer having reflection properties in the infrared and/or in solar radiation, for example based on silver or a metal alloy containing silver, and two antireflection films. The films each include at least two dielectric layers, the functional layer being placed between the two antireflection films. Each antireflection film includes at least one high-refractive-index dielectric layer located in contact with or close to the functional layer.

17 Claims, 1 Drawing Sheet

Figure 1:
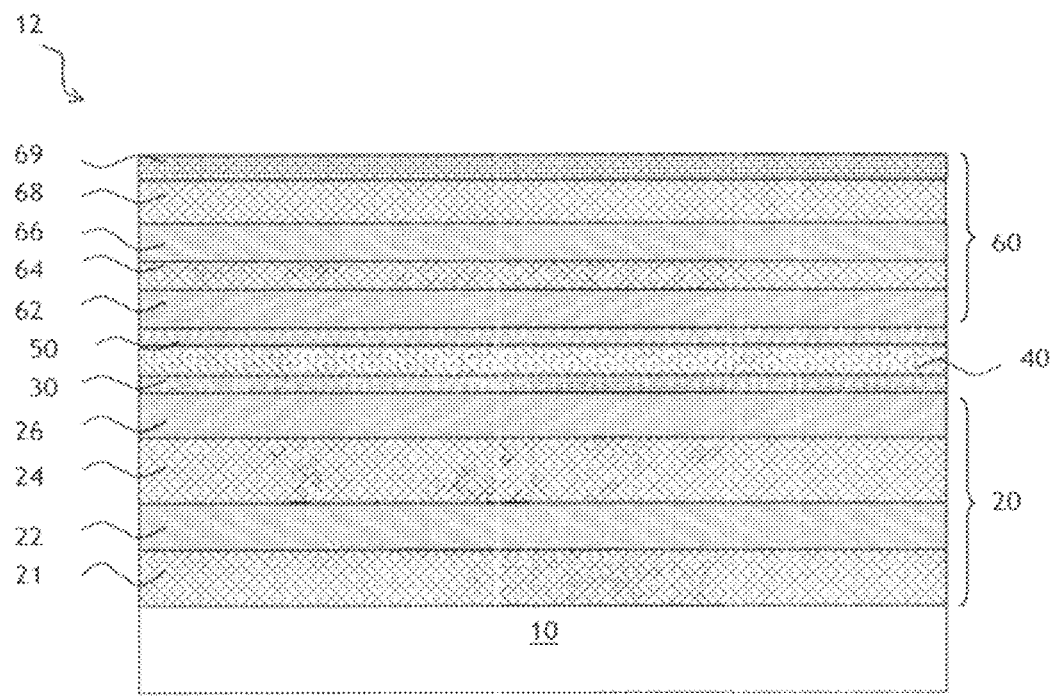

(51) Int. Cl.
  *B32B 17/10* (2006.01)
  *G02B 5/28* (2006.01)
(52) U.S. Cl.
  CPC ........ *C03C 17/366* (2013.01); *C03C 17/3626* (2013.01); *C03C 17/3644* (2013.01); *C03C 2217/73* (2013.01); *G02B 5/282* (2013.01); *Y10T 428/24942* (2015.01)
(58) Field of Classification Search
  CPC ............ C03C 17/3647; C03C 17/3652; C03C 17/3655; C03C 17/3671; C03C 17/3681; G02B 1/10–1/116; G02B 5/20; G02B 5/208; G02B 5/28–5/283; G02B 5/285–58/288; B32B 17/10229
  USPC ........ 428/212–213, 215–216, 220, 426, 428, 428/432–434, 688–689, 697–699, 428/701–702, 704; 359/350–352, 359/359–361, 577, 580–582, 584–590
  See application file for complete search history.

(56) References Cited

U.S. PATENT DOCUMENTS

| | | | |
|---|---|---|---|
| 6,040,939 A * | 3/2000 | Demiryont et al. | 359/360 |
| 6,589,658 B1 * | 7/2003 | Stachowiak | 428/432 |
| 7,087,309 B2 * | 8/2006 | Kriltz | 428/432 |
| 2006/0099428 A1 * | 5/2006 | Butz | C03C 17/36 428/432 |
| 2006/0246301 A1 | 11/2006 | Stachowiak | |
| 2009/0197077 A1 * | 8/2009 | Reutler et al. | 428/336 |
| 2011/0070417 A1 | 3/2011 | Reutler et al. | |

OTHER PUBLICATIONS

U.S. Appl. No. 13/978,042, filed Jul. 2, 2013, Laurent, et al.
International Search Report issued Jun. 30, 2010 in PCT/FR10/050391 filed Mar. 8, 2010.

* cited by examiner

SUBSTRATE PROVIDED WITH A MULTILAYER COATING HAVING THERMAL PROPERTIES, WHICH INCLUDES HIGH-REFRACTIVE-INDEX LAYERS

CROSS-REFERENCE TO PRIORITY APPLICATIONS

The present application is the U.S. counterpart of WO 10/103224, and claims priority to French Application No. 0951458 filed on Mar. 9, 2009, the entire contents of each of which are hereby incorporated by reference in their entirety.

The invention relates to a transparent substrate, especially made of a rigid mineral material such as glass, said substrate being coated with a thin-film multilayer coating that includes a functional layer of the metallic type that can act on solar radiation and/or infrared radiation of long wavelength.

The invention relates more particularly to the use of such substrates for manufacturing thermal insulation and/or solar protection glazing units. These glazing units may be intended both for equipping buildings and for equipping vehicles, especially with the purpose of reducing air-conditioning load and/or preventing overheating (called "solar control" glazing) and/or reducing the amount of energy dissipated to the outside (called "low-E" or "low-emissivity" glazing) brought about by the ever increasing use of glazed surfaces in buildings and in vehicle passenger compartments.

Such glazing may also be integrated into glazing units having particular functionalities, such as for example heating glazing units or electrochromic glazing units.

One type of multilayer coating known for giving substrates such properties consists of a metallic functional layer having reflection properties in the infrared and/or in solar radiation, especially a metallic functional layer based on silver or a metal alloy containing silver.

In this type of multilayer coating, the functional layer is thus placed between two antireflection films each comprising in general several layers that are each made of a dielectric material of the nitride type and especially silicon nitride or aluminum nitride, or of the oxide type. From the optical standpoint, the purpose of these films that flank the metallic functional layer is to "antireflect" this metallic functional layer.

However, a blocker film is sometimes interposed between one or each antireflection film and the functional metallic layer; the blocker film placed beneath the functional layer in the direction of the substrate and protects said functional layer during an optional high-temperature heat treatment of the bending and/or tempering type, and the blocker film placed on the functional layer on the opposite side from the substrate protects this layer from any degradation during the deposition of the upper antireflection film and during an optional high-temperature heat treatment of the bending and/or tempering type.

It is known, for example from patent application EP 678 484, that a high-refractive-index dielectric layer, for example made of niobium oxide or titanium oxide, placed between the substrate and the metallic functional layer may make it possible to "antireflect" the metallic functional layer.

To further improve the optical characteristics, one solution consists in using a high-refractive-index dielectric layer on each side of the metallic functional layer.

However, these high-index materials cannot be deposited at rates as high as those for lower-index materials, thereby posing, on the one hand, manufacturing process problems when the deposition is carried out continuously and, on the other hand, problems of increased production cost if it is necessary to reduce the efficiency of the thin-film deposition machine (in terms of the number of coated substrates that are produced per unit of operating time).

Moreover, the targets used for depositing these materials by reactive sputtering, for example using what is called the "magnetron" process, especially reactive magnetron sputtering, are in general more expensive than the targets for depositing lower-index materials.

There is thus a need to minimize the amount of high-refractive-index material when a material of this type is present on each side of the metallic functional layer.

This solution must also make it possible to obtain an acceptable color, especially in reflection, in particular one which is not in the red.

The object of the invention is to succeed in remedying the drawbacks of the prior art, by developing a novel type of multilayer coating comprising a single functional layer, which coating has a low sheet resistance (and therefore a low emissivity), a high light transmission and a relatively neutral color, in particular in reflection on the layer side (but also on the opposite side, namely the "substrate side"), these properties preferably being maintained within a restricted range whether or not the multilayer coating undergoes one or more high-temperature heat treatments of the bending and/or tempering and/or annealing type.

Another important object is to provide a multilayer coating that comprises a single functional layer and that has a low emissivity while still having a low light reflection in the visible, and an acceptable color, especially in reflection, in particular one not in the red.

Thus, one subject of the invention, in its broadest acceptance, is a glass substrate as claimed in claim 1. This substrate is provided on a main face with a thin-film multilayer coating comprising a metallic functional layer having reflection properties in the infrared and/or in solar radiation, especially based on silver or a metal alloy containing silver, and two antireflection films, said films each comprising at least two dielectric layers, said functional layer being placed between the two antireflection films, on the one hand the functional layer being optionally deposited directly on an underblocker film placed between the subjacent antireflection film and the functional layer and, on the other hand, the functional layer being optionally deposited directly beneath an overblocker film placed between the functional layer and the superjacent antireflection film. According to the invention:

each antireflection film includes at least one high-refractive-index dielectric layer located in contact with or close to the functional layer, the total optical thickness of the high-refractive-index dielectric layer or of all of the high-refractive-index dielectric layers which is or are located in the subjacent antireflection film represents between 30 and 75% of the total optical thickness of this subjacent antireflection film and the total optical thickness of the high-refractive-index dielectric layer or of all of the high-refractive-index dielectric layers which is or are located in the superjacent antireflection film represents between 10 and 60% of the total optical thickness of this superjacent antireflection film.

The term "film" in the context of the present invention should be understood to mean that there may be a single layer or several layers of different materials within the film.

The term "high-refractive-index dielectric layer" is understood in the present invention to mean a layer whose constituent material has a refractive index measured at a wavelength of 550 nm which is equal to or greater than 2.2, or even equal to or greater than 2.3. This index, measured at this wavelength, is in general well known from the literature for the usual materials in the field of thin-film multilayer coatings.

The term "in contact" is understood in the present invention to mean that no layer is interposed between the high-refractive-index layer and the metallic functional layer. In this case, there is therefore no blocker film.

The term "close" is understood in the invention to mean that at least one layer is interposed between the high-refractive-index layer and the metallic functional layer without the physical thickness of the layer (or of all of the layers) interposed between the high-refractive-index layer and the metallic functional layer exceeding 10 nm.

The term "optical thickness" is understood in the invention to mean, as is usual, the product of the physical (or actual) thickness of the layer multiplied by its refractive index measured as usual at 550 nm.

The term "total optical thickness" is understood in the invention to mean the sum of all the optical thicknesses of the layers in question, each optical thickness being, as explained above, the product of the physical (or actual) thickness of the layer multiplied by its refractive index measured as usual at 550 nm.

Thus, the total optical thickness of the subjacent antireflection film is formed from the sum of all the optical thicknesses of the dielectric layers of this film that are placed between the substrate and the functional metallic layer or between the substrate and the underblocker film if this is present.

Likewise, the total optical thickness of the superjacent antireflection film is formed from the sum of all the optical thicknesses of the dielectric layers of this film that are placed above the functional metallic layer, on the opposite side from the substrate, or on top of the overblocker film if this is present.

In fact, according to the invention, within the subjacent or superjacent antireflection film, the optical thickness of the high-refractive-index dielectric layer, if this is the only high-refractive-index dielectric layer, or the sum of the optical thicknesses of all of the high-refractive-index dielectric layers if several high-refractive-index dielectric layers are present:

in the case of the subjacent antireflection film, is between 30 and 75%, including these values, or even between 35 and 55% including these values, of the total optical thickness of this subjacent antireflection film; and in the case of the superjacent antireflection film, is between 10 and 60%, including these values, or even between 15 and 35% including these values, of the total optical thickness of this superjacent antireflection film.

It is therefore essential according to the invention that the high-refractive-index material be located in contact with or close to the metallic functional layer, on each side of this layer, and that this high-refractive-index material be in a sufficient amount (hence the value at the start of the percentage range) without being in too high an amount (hence the value at the end of the percentage range).

However, a certain imbalance has been observed, on the one hand, between the minimum thicknesses of high-refractive-index material in the superjacent antireflection film and in the subjacent antireflection film (10% and 30% respectively, or even 15% and 35% respectively) and, on the other hand, between the maximum thicknesses of high-refractive-index material in the superjacent antireflection film and in the subjacent antireflection film (60% and 75% respectively, or even 35% and 55% respectively).

Because of this distribution according to the invention in the high-refractive-index material, it is therefore possible to limit the thickness of high-refractive-index layers. These layers may have a physical thickness of at least 5 nm, or even at least 8 nm, in the subjacent film and may have a physical thickness of at most 25 nm, or at most 20 nm, or at most 16 nm, or at most 14 nm, it being possible for all these minimum values to be combined with these maximum values.

In particular, on the one hand, the total optical thickness of the high-refractive-index dielectric layer or of all of the high-refractive-index dielectric layers which is or are located in the subjacent antireflection film may thus be between 15 and 65 nm, including these values, or even between 18 and 50 nm, including these values and, on the other hand, the total optical thickness of the high-refractive-index dielectric layer or of all of the high-refractive-index dielectric layers which is or are located in the superjacent antireflection film may thus be between 8 and 60 nm, including these values, or else between 12 and 35 nm including these values, it being possible for these ranges in the case of the subjacent antireflection films to be combined with these ranges for the superjacent antireflection films.

Moreover, it turns out that, surprisingly, the high-refractive-index material of the high-refractive-index dielectric layers is, for preference, predominantly in the dielectric film subjacent to the metallic functional layer in such a way that the ratio of the total optical thickness of the high-refractive-index dielectric layer or of all of the high-refractive-index dielectric layers which is or are located in the subjacent antireflection film to the total optical thickness of the high-refractive-index dielectric layer or of all of the high-refractive-index dielectric layers which is or are located in the superjacent antireflection film is between 1.1 and 5 including these values, or between 1.2 and 4 including these values, or even between 1.3 and 3.8 including these values. This ratio defined below as R may in particular be equal to 1.4 or 1.5.

The constituent material of each high-refractive-index dielectric layer is preferably chosen from: titanium oxide, niobium oxide or silicon nitride doped with zirconium and optionally also doped with Al.

Titanium oxide $TiO_2$, in thin-film form deposited by cold reactive magnetron sputtering, has an index between 2.35 and 2.5 at 550 nm depending on the crystallinity of the layer (which depends on the deposition conditions, such as for example whether the layer is deposited cold or hot)—see for examples of indices the document entitled "*Spectroellipsometric characterization of materials for multilayer coatings*" published in the journal Applied Surface Science, 175-176 (2001) pages 276-280.

Niobium oxide $Nb_2O_5$, in thin-film form, may have a refractive index between 2.25 and 2.40 at 550 nm according to the document entitled "*Characterization of sputtered and annealed niobium oxide films using spectroscopic ellipsometry, Rutherford backscattering spectrometry and X-ray diffraction*" published in the journal Thin Solid Film, 516 (2008) pages 8096-8100.

The reader may also refer to patent application EP 1 656 328 A2 which discloses the production of an $Si_3N_4$:Zr layer for an antireflection film and gives on page 12 the index of $Si_3N_4$:Zr depending on the Zr content (and the indices of $TiO_2$ and $Nb_2O_5$ on page 3).

The high-index layers according to the invention need not be strictly stoichiometric—they may be substoichiometric or superstoichiometric in terms of oxygen in the case of oxides and/or substoichiometric or superstoichiometric in terms of nitrogen in the case of nitrides.

Furthermore, to obtain an acceptable compromise between high light transmission, neutral colors in reflection and relatively high selectivity (i.e. the ratio of the light transmission $T_L$ in the visible of the glazing to the solar factor SF of the glazing is such that $S=T_{Lvis}/SF$), the ratio E of the optical thickness in nm of the subjacent antireflection film to the optical thickness in nm of the superjacent antireflection film is preferably such that: $0.4 \leq E \leq 0.9$, or else $0.5 \leq E \leq 0.8$. In one particular embodiment, said subjacent antireflection film and said superjacent antireflection film each include at least one dielectric layer based on silicon nitride, optionally doped with at least one other element such as aluminum.

In one particular embodiment, the final layer or overcoat of the subjacent antireflection film, that furthest away from the substrate, is an oxide-based wetting layer, especially one based on zinc oxide, optionally doped with at least one other element such as aluminum.

In one particular embodiment, the subjacent antireflection film includes at least one nitride-based dielectric layer, especially based on silicon nitride and/or aluminum nitride, and at least one noncrystalline smoothing layer made of a mixed oxide, said smoothing layer being in contact with a crystalline superjacent wetting layer.

Preferably, the underblocker film and/or the overblocker film comprise/comprises a thin layer based on nickel or titanium having a physical thickness e such that $0.2 \text{ nm} \leq e \leq 1.8 \text{ nm}$.

In one particular version, at least one thin nickel-based layer, and especially that of the overblocker film, comprises chromium, preferably comprising 80% Ni and 20% Cr by weight.

In another particular version, at least one thin nickel-based layer, and especially that of the overblocker film, comprises titanium, preferably comprising 50% Ni and 50% Ti by weight.

Moreover, the underblocker film and/or the overblocker film may include at least one thin nickel-based layer present in metallic form if the substrate provided with the thin-film multilayer coating has not undergone a bending and/or tempering heat treatment after deposition of the coating, this layer being at least partially oxidized if the substrate provided with the thin-film multilayer coating has undergone at least one bending and/or tempering heat treatment after the coating has been deposited.

The thin nickel-based layer of the underblocker film and/or the thin nickel-based layer of the overblocker film, when said layer(s) are/is present, are/is preferably in direct contact with the functional layer.

The final layer or overcoat of the superjacent antireflection film, that furthest away from the substrate, is preferably based on an oxide, preferably deposited substoichiometrically, and especially is based on titanium oxide ($TiO_x$) or based on a mixed tin zinc oxide ($SnZnO_x$), optionally doped by another element in an amount of at most 10% by weight.

The multilayer coating may thus include a final layer or overcoat, i.e. a protective layer.

This protective layer preferably has a physical thickness between 0.5 and 10 nm.

The glazing according to the invention incorporates at least the substrate bearing the multilayer coating according to the invention, optionally combined with at least one other substrate. Each substrate may be clear or tinted. At least one of the substrates may especially be made of bulk-tinted glass. The choice of coloration type will depend on the level of light transmission and/or on the colorimetric appearance that is/are desired for the glazing once its manufacture has been completed.

The glazing according to the invention may have a laminated structure, especially one combining at least two rigid substrates of the glass type with at least one sheet of thermoplastic polymer, so as to have a structure of the following type: glass/thin-film multilayer coating/sheet(s)/glass. The polymer may especially be based on polyvinyl butyral PVB, ethylene-vinyl acetate EVA, polyethylene terephthalate PET or polyvinyl chloride PVC.

Moreover, the glazing may have a structure of the type: glass/thin-film multilayer coating/polymer sheet(s).

The glazing according to the invention is able to undergo a heat treatment without the thin-film multilayer coating being damaged. Optionally, said glazing is bent and/or tempered.

The glazing may be bent and/or tempered as a single substrate, that provided with the multilayer coating. This is then referred to as "monolithic" glazing. If the glazing is bent, especially for the purpose of forming vehicle windows, the thin-film multilayer coating is preferably on a face which is at least partly nonplanar.

The glazing may also be a multiple-glazing unit, especially a double-glazing unit, at least the substrate bearing the multilayer coating being able to be bent and/or tempered. It is preferable in a multiple-glazing configuration for the multilayer coating to be placed on the side facing the intermediate gas-filled cavity. In a laminated structure, the multilayer coating may be in contact with the polymer sheet.

The glazing may also be a triple-glazing unit consisting of three glass sheets separated pairwise by a gas-filled cavity. In a triple-glazing structure, the substrate bearing the multilayer coating may be on face 2 and/or on face 5 when considering that the incident direction of the sunlight passes through the faces in the order of increasing face number.

When the glazing is monolithic glazing or multiple glazing of the double-glazing, triple-glazing or laminated glazing type, at least the substrate bearing the multilayer coating may be made of bent or tempered glass, it being possible for this substrate to be bent or tempered before or after deposition of the multilayer coating.

When this glazing is mounted as a double-glazing unit, it preferably has a selectivity $S \geq 1.3$, or even $S \geq 1.4$, or $S \geq 1.5$ or even $S > 1.5$.

The invention also relates to the use of the substrate according to the invention for producing double glazing, having a selectivity $S \geq 1.3$, or even $S > 1.4$, or $S \geq 1.5$ or even $S > 1.5$.

The substrate according to the invention may in particular be used for producing a transparent electrode of heating glazing or of electrochromic glazing or of a lighting device or of a display device or of a photovoltaic panel.

Advantageously, the present invention thus makes it possible to produce a thin-film multilayer coating comprising a single functional layer, having, in a multiple-glazing configuration, and especially a double-glazing configuration, a high selectivity ($S \geq 1.35$), a low emissivity ($\in_N \leq 3\%$) and an esthetically attractive appearance ($T_{Lvis} \geq 70\%$, $R_{Lvis} \leq 25\%$, neutral colors in reflection).

The multilayer coating comprising a single functional layer according to the invention costs less to produce than a multilayer coating comprising two functional layers having similar characteristics.

Figure 2:
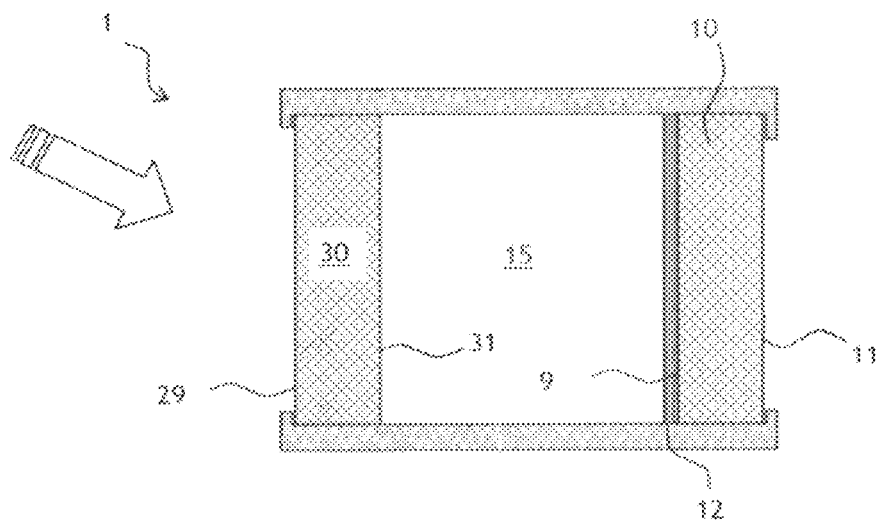

The details and advantageous features of the invention will emerge from the following nonlimiting examples illustrated by means of FIG. 1 appended herewith, which illustrates a multilayer coating 12 comprising a single functional layer according to the invention deposited on a substrate 10, the functional layer being provided with an underblocker film and with an overblocker film, and the coating being furthermore provided with an optional protective film, and by means of FIG. 2, which illustrates the production of a double-glazing unit (DGU) 1 formed from two glass sheets, each constituting a substrate 10, 30, said sheets being separated by an intermediate gas-filled cavity 15.

One of the glass sheets, the sheet furthest toward the inside of the building when considering the incident direction of sunlight entering the building illustrated by the double-sided arrow directed in the figure from the left to the right, constitutes the substrate 10 which is coated on its inner face 9 turned toward the intermediate gas-filled cavity with an insulating film consisting of a multilayer coating 12 comprising a single functional layer described below (the multilayer coating comprising a single functional layer is thus on the inner face, called "face 3", of the double glazing); the outer face 11 of the substrate 10 is not coated with any thin-film multilayer coating.

The other glass sheet, the substrate 30, is not coated on its inner face 31 turned toward the intermediate gas-filled cavity with an insulating film, this sheet being namely the sheet furthest to the outside of the building when considering the incident direction of sunlight; its external face 29 (called "face 1") may for example be coated with a self-cleaning film.

In these figures, the proportions between the thicknesses of the various layers have not been strictly respected in order to make them easier to examine.

Moreover, in all the examples below the thin-film multilayer coating 12 is deposited on a substrate 10 made of clear soda-lime glass (PLANILUX from Saint-Gobain) with a thickness of 4 mm.

Furthermore, in these examples, in all cases when a heat treatment was applied to the substrate, this was an annealing operation carried out for about 8 minutes at a temperature of about 620° C. followed by cooling down to room temperature (about 20° C.) so as to simulate a bending or tempering heat treatment.

In all the examples below, in the case of the double-glazing configuration, the thin-film multilayer coating was positioned on face 3, that is to say on the sheet furthest to the outside of the building when considering the incident direction of sunlight entering the building, on its face turned toward the gas-filled cavity, as illustrated in FIG. 2, having the following configuration: 4-16 (90% Ar)-4, i.e. formed from two 4 mm transparent glass sheets, each comprising a substrate 10, 30 separated by an intermediate gas-filled cavity 15 containing 90% argon and 10% air with a thickness of 16 mm, the whole assembly being held together by a frame structure.

FIG. 1 illustrates the structure of a multilayer coating comprising a single functional layer deposited on the transparent glass substrate 10, in which the single functional layer 40 is placed between two antireflection films, namely the subjacent antireflection film 20 lying beneath the functional layer 40 in the direction of the substrate 10 and the superjacent antireflection film 60 lying above the functional layer 40 on the opposite side from the substrate 10.

These two antireflection films 20, 60 each comprise at least one dielectric layer 21, 22, 24, 26; 62, 64, 66, 68, 69.

Optionally, on the one hand the functional layer 40 may be deposited on an unblocker film 30 placed between the subjacent antireflection film 20 and the functional layer 40 and, on the other hand, the functional layer 40 may be deposited directly beneath an overblocker film 50 placed between the functional layer 40 and the superjacent antireflection film 60.

FIG. 1 shows that the lower antireflection film 20 comprises four antireflection layers 21, 22, 24 and 26, that the upper antireflection film 60 comprises four antireflection layers 62, 64, 66 and 68 and that this antireflection film 60 terminates in an optional protective layer 69, particularly one based on an oxide, especially an oxygen-substoichiometric layer.

According to the invention, each antireflection film 20, 60 includes at least one high-refractive-index dielectric layer 24, 64 located in contact with or close to the functional layer 40 and, on the one hand, the total optical thickness $e_2$ of the high-refractive-index dielectric layer 24 or of all of the high-refractive-index dielectric layers which is or are located in the subjacent antireflection film 20 represents between 30 and 75% of the total optical thickness $e_{20}$ of this subjacent antireflection film 20 and, on the other hand, the total optical thickness $e_6$ of the high-refractive-index dielectric layer 64 or of all of the high-refractive-index dielectric layers which is or are located in the superjacent antireflection film 60 represents between 10 and 60% of the total optical thickness $e_{60}$ of this superjacent antireflection film 60.

Moreover, each antireflection film 20, 60 preferably includes at least one high-refractive-index dielectric layer 24, 64 located in contact with or close to the functional layer 40 and, on the one hand, the total optical thickness $e_2$ of the high-refractive-index dielectric layer 24 or of all of the high-refractive-index dielectric layers which is or are located in the subjacent antireflection film 20 represents between 35 and 55% of the total optical thickness $e_{20}$ of this subjacent antireflection film 20 and, on the other hand, the total optical thickness $e_6$ of the high-refractive-index dielectric layer 64 or of all of the high-refractive-index dielectric layers which is or are located in the superjacent antireflection film 60 represents between 15 and 55% of the total optical thickness $e_{60}$ of this superjacent antireflection film 60.

Furthermore, the ratio E of the optical thickness $e_{20}$ in nm of the subjacent antireflection film 20 to the optical thickness $e_{60}$ in nm of the superjacent antireflection film 60 is preferably such that:

$0.4 \leq E \leq 0.9$, or else $0.5 \leq E \leq 0.8$.

A numerical simulation was firstly carried out (examples 1 to 3 according to the invention and counterexamples 9 to 13, which are not according to the invention, given below) and then two thin-film multilayer coatings were actually deposited: example 1 and counterexample 11.

Table 1 below gives the physical thicknesses in nanometers of each of the layers or films of examples 1 to 3 and counterexamples 9 to 13, table 2 collates the main data relating to these examples, especially the optical thicknesses, and table 3 gives the main optical characteristics of these examples obtained by simulation.

In table 1, the "No." column indicates the number of the layer associated with the configuration shown in FIG. 1 and the second column indicates the material deposited.

TABLE 1

| No. | | 9 | 10 | 1 | 11 | 2 | 12 | 3 | 13 |
|---|---|---|---|---|---|---|---|---|---|
| 69 | ZnSnO$_x$ | 2 | 2 | 2 | 2 | 2 | 2 | 2 | 2 |
| 68 | TiO$_2$ | 0 | 0 | 0 | 0 | 0 | 10 | 0 | 0 |
| 66 | Si$_3$N$_4$ | 48 | 5 | 35.5 | 27 | 31 | 35.5 | 30 | 23 |
| 64 | TiO$_2$ | 0 | 29 | 10 | 10 | 10 | 0 | 8 | 8 |
| 62 | ZnO | 5 | 5 | 5 | 14 | 9 | 5 | 5 | 14 |
| 50 | NiCr | 0.2 | 0.2 | 0.2 | 0.2 | 0.2 | 0.2 | 0.2 | 0.2 |
| 40 | Ag | 15 | 15 | 15 | 15 | 15 | 15 | 10.5 | 10.5 |
| 30 | NiCr | — | — | — | — | — | — | 0.5 | 0.5 |
| 26 | ZnO | 5 | 5 | 5 | 14 | 9 | 5 | 5 | 5 |
| 24 | TiO$_2$ | 0 | 21 | 14 | 14 | 14 | 14 | 12 | 0 |
| 22 | Si$_3$N$_4$ | 30 | 4 | 14 | 5 | 10 | 14 | 19 | 19 |
| 21 | TiO$_2$ | — | — | — | — | — | — | — | 12 |

Table 2 gives the following data:

$e_2$ and $e_6$, which are the total optical thicknesses of the high-refractive-index dielectric layers 24, 64 of the subjacent antireflection film 20 and superjacent antireflection film 60 respectively (or else the total optical thicknesses of the high-refractive-index layers 22, 68 for counterexamples 13 and 12 respectively);

$e_{20}$ and $e_{60}$, which are the total optical thicknesses of the subjacent antireflection film 20 and superjacent antireflection film 60 respectively;

%2, which is the percentage of the total optical thickness $e_2$ of the single high-refractive-index dielectric layer 24 (or else of the single layer 21 in the case of counterexample 13) of the subjacent antireflection film 20 relative to the total optical thickness $e_{20}$ of this subjacent antireflection film 20;

%6, which is the percentage of the total optical thickness $e_6$ of the single high-refractive-index dielectric layer 64 (or else of the single layer 68 in the case of the counterexample 12) of the superjacent antireflection film 60 relative to the total optical thickness $e_{60}$ of this superjacent antireflection film 60; and d2 and d6, which are the physical distances between each high-refractive-index dielectric layer 24, 64 respectively and the functional layer 40 (or else the physical distances between each high-refractive-index dielectric layer 21, 68 respectively and the functional layer 40 for counterexamples 13 and 12 respectively).

In this table 2, the index of each layer considered for calculating the optical thicknesses is:
Si$_3$N$_4$:2.05
ZnO:1.9
TiO$_2$:2.4
ZnSnO$_x$:2.0.

TABLE 2

| | Ex. | | | | | | | |
|---|---|---|---|---|---|---|---|---|
| | 9 | 10 | 1 | 11 | 2 | 12 | 3 | 13 |
| $e_2$ (nm) | 0 | 50 | 34 | 34 | 34 | 34 | 29 | 29 |
| $e_{20}$ (nm) | 71 | 68 | 72 | 70 | 71 | 72 | 77 | 77 |
| %2 | 0 | 74 | 47 | 48 | 47 | 47 | 37 | 37 |
| $e_6$ (nm) | 0 | 70 | 24 | 24 | 24 | 24 | 19 | 19 |
| $e_{60}$ (nm) | 112 | 93 | 110 | 110 | 109 | 110 | 94 | 97 |
| %6 | 0 | 75 | 22 | 22 | 22 | 22 | 20 | 20 |
| d2 (nm) | | 5 | 5 | 14 | 9 | 5 | 5 | 24 |
| d6 (nm) | | 5 | 5 | 14 | 9 | 5 | 35.5 | 14 |
| R = $e_2/e_6$ | | 0.7 | 1.4 | 1.4 | 1.4 | 1.4 | 1.5 | 1.5 |
| E = $e_{20}/e_{60}$ | 0.63 | 0.73 | 0.65 | 0.63 | 0.65 | 0.65 | 0.82 | 0.79 |

Table 3 shows the optical characteristics of the substrate coated with the multilayer coating:

TL$_{vis}$, which is the light transmission T$_L$ in the visible in % measured under the illuminant D$_{65}$ at 2°;

the colors in transmission a$_T$* and b$_T$* in the LAB system, measured under illuminant D$_{65}$ at 2°, on the opposite side of the substrate from the main face on which the thin-film multilayer coating is deposited;

Rc$_{vis}$, which is the light reflection in the visible in % measured under illuminant D$_{65}$ at 2°, on the main face of the substrate, on which the thin-film multilayer coating is deposited; and the colors in reflection a$_{Rc}$* and b$_{Rc}$* in the LAB system measured under illuminant D$_{65}$ at 2°, on the opposite side of the substrate from the main face on which the thin-film multilayer coating is deposited.

Table 3 also shows the factor g, or solar factor, in % (CEN standard), considered in a 4-16 (90% Ar)-4 double-glazing configuration, with the thin-film multilayer coating on face 3, and the other substrate being a clear standard glass (PLANILUX from Saint-Gobain), as illustrated in FIG. 2.

TABLE 3

| | Ex. | | | | | | | |
|---|---|---|---|---|---|---|---|---|
| | 9 | 10 | 1 | 11 | 2 | 12 | 3 | 13 |
| TL$_{vis}$ | 71.9 | 83.2 | 78.3 | 76.7 | 77.5 | 73.8 | 85.4 | 85.7 |
| a$_T$* | −3.3 | −4.6 | −3.2 | −3.7 | −3.4 | −2.9 | −1.8 | −2.7 |
| b$_T$* | 3.3 | 4.1 | 2.2 | 4.4 | 3.0 | 4.5 | 0.1 | 1.9 |
| Rc$_{vis}$ | 21.0 | 9.3 | 14.5 | 16.3 | 15.3 | 19.3 | 4.2 | 4.5 |
| a$_{Rc}$* | 4.2 | 11.1 | 4.8 | 5.4 | 4.8 | 2.8 | 0.3 | 6.0 |
| b$_{Rc}$* | −10.5 | −17.7 | −9.7 | −13.8 | −11.5 | −12.7 | −11.2 | −18.9 |
| g | 45.9 | 50.1 | 49.2 | 47.9 | 48.7 | 47.1 | 60.3 | 59.7 |

In example 9, there is no high-refractive-index layer, either in the subjacent antireflection film 20, between the substrate and the functional layer 40, or in the superjacent antireflection film 60 on top of the functional layer 40.

The multilayer coating in this example 9 is useful because it has an acceptable color, both in transmission (negative a$_T$* and positive b$_T$*, both of relatively low absolute value) and in reflection on the coating side (positive a$_{Rc}$* and negative b$_{Rc}$*, both of relatively low absolute value) and because it is of the type "which can be tempered" or "to be tempered" as its optical properties are maintained during a heat treatment, but it does not have a very high light transmission since the functional layer is not correctly "antireflected". Consequently, the light reflection is also relatively high.

In example 10, two high-refractive-index dielectric layers 24, 64 are introduced into the multilayer coating in the subjacent antireflection film 20 and the superjacent antireflection film 60 respectively.

However, these two layers are relatively thick, in particular those of the subjacent antireflection film, making it expensive to deposit them and complicating the deposition process.

The light transmission is greatly increased compared with example 9, and consequently the light reflection is very greatly lowered and the solar factor increased. However, the color is not entirely satisfactory, in particular in reflection on the multilayer coating side: a$_{Rc}$* and b$_{Rc}$* are both too high in absolute value, leading to a color in the red-violet tones.

Example 10 shows that the proportion of the optical thickness of the high-index layer 24 to the total optical thickness of the subjacent antireflection film 20 is high (74%), whereas most of the high-index material (all of layers 24 and 64) lies in the superjacent antireflection film 60 (the ratio R being less than 1, here 0.7).

In example 1 according to the invention, as in example 10, two high-refractive-index dielectric layers 24, 64 are introduced into the multilayer coating in the subjacent antireflection film 20 and the superjacent antireflection film 60 respectively.

These two layers 24, 64 are maintained, as in example 10, close to the functional layer 40 since in both cases a single layer (26, 62 respectively) with a physical thickness of 5 nm is inserted between, on the one hand, the high-refractive-index layer 24 and the functional layer 40 and, on the other hand, the functional layer 40 and the high-refractive-index layer 64.

However, these two layers are thinner in the case of example 1 than in the case of example 10, thereby costing less to deposit and simplifying the deposition process: the proportion of the optical thickness of each high-refractive-index layer 24, 64 represents less than one half of the total optical thickness of the subjacent antireflection film 20 and of the superjacent antireflection film 60 respectively (namely 47 % and 22 % respectively).

Moreover, most of the high-refractive-index material is no longer in the superjacent antireflection film 60 as in example 10, but in the subjacent antireflection film 20 since the ratio R is greater than 1 (it is 1.4).

In this example 1, although the light transmission is slightly lower than that of example 10, it remains quite acceptable and well above that of example 9; although the light reflection is slightly higher than that of example 10, it remains quite acceptable and well below that of example 9; and, surprisingly, the solar factor is maintained at a value almost the same as that of example 10.

Furthermore, and most particularly, the color in transmission is better than in example 10 ($a_T^*$ and above all $b_T^*$ values that are tower in absolute value) and the color in reflection is also appreciably better (lower $a_{Rc}^*$ and $b_{Rc}^*$ in absolute value).

In example 11, the composition of the multilayer coating is identical to that of example 1 except that the intermediate layers 26 and 62 are thickened, this having the effect of increasing the distances d2 and d6 (to 14 nm) between, on the one hand, the high-refractive-index dielectric layer 24 and the functional layer 40 and, on the other hand, the functional layer 40 and the high-refractive-index dielectric layer 64 respectively.

This lowers the light transmission and increases the light reflection, and also lowers the solar factor, and moreover results in an unacceptable color in reflection on the multilayer coating side ($a_{Rc}^*>5$) and a less favorable color in transmission ($b_T^*>4$).

Example 2 according to the invention illustrates the limit in obtaining the technical effect according to the invention: this example 2 is identical to example 1 except that the intermediate layers 26 and 62 have been thickened, this having the effect of increasing the distances d2 and d6 (to 9 nm), but these intermediate layers 26 and 62 are thickened less than in example 11.

In example 12, the composition of the multilayer coating is identical to that of example 1 except that the intermediate layer 62 is thickened, this having the effect of increasing the distance d6 (to 35.5 nm).

This greatly lowers the light transmission and greatly increases the light reflection, and also lowers the solar factor.

Example 3 according to the invention illustrates how the technical effect is obtained with another multilayer coating structure, namely a structure having an underblocker film 30 and an overblocker film 50.

The two high-refractive-index layers 24, 64 are maintained, as in example 1, close to the functional layer 40 since, in both cases, a single layer (26, 62, respectively) with a physical thickness of 5 nm is inserted between, on the one hand, the high-refractive-index layer 24 and the functional layer 40 and, on the other hand, the functional layer 40 and the high-refractive-index layer 64, if the thickness of the blocker films 30, 50 is not taken into account.

These two high-refractive-index layers 24, 64 are deposited with optical thicknesses similar to those of example 1 and, as in the case of example 1, the proportion of the optical thickness of each high-refractive-index layer 24, 64 represents less than one half of the total optical thickness of the subjacent antireflection film 20 and of the superjacent antireflection film 60 respectively (37% and 20% respectively).

Moreover, as in example 1, most of the high-refractive-index material is in the subjacent antireflection film 20 since the ratio R is greater than 1 (it can even be 1.5).

With such a multilayer coating structure, the light transmission is much higher than that of example 1, the light reflection is much lower than that of example 1 and the solar factor is greatly increased, mainly due to the fact that the silver layer is thinner, hence an emissivity that will also be increased.

The color, both in transmission and in reflection on the multilayer coating side is very acceptable.

To make the comprehension of the invention clearer, an example 13 based on example 3 is proposed.

This time, the distances d2 and d6 are very greatly increased since the high-index layer of the subjacent antireflection film 20 (the layer numbered 21) is deposited directly on the substrate and since in total a physical thickness of 24 nm of material is interposed between this layer and the functional layer 40 (not taking into account the thickness of the underblocker film 30) and the high-index layer 64 of the superjacent antireflection film 60 is deposited directly on an intermediate layer with a physical thickness of 14 nm (not taking into account the thickness of the overblocker film 50).

These two high-refractive-index layers 21, 64 are deposited with optical thicknesses similar to those of example 3 and, as in example 3, the proportion of the optical thickness of each absorbent layer 21, 64 represents less than one half of the total optical thickness of the subjacent antireflection film 20 and of the superjacent antireflection film 60 respectively (37% and 20% respectively).

Table 3 clearly shows that, compared to example 3, the light transmission and the tight reflection are maintained, but the color in reflection of this example 13 is not acceptable because $a_{Rc}^*$ and $b_{Rc}^*$ are too high in absolute value.

The purpose of example 1 and counterexample 11 was for validation by depositing the corresponding multilayer coatings as shown in table 1 on a substrate.

In these examples, the layers were deposited under the following conditions:

TABLE 4

| Layer | Target used | Deposition pressure | Gas |
|---|---|---|---|
| $Si_3N_4$ | 92:8 wt % Si:Al | $1.5 \times 10^{-3}$ mbar | $Ar/(Ar + N_2) = 0.45$ |
| $TiO_2$ | $TiO_x$ with x around 1.9 | $1.5 \times 10^{-3}$ mbar | $Ar/(Ar + O_2) = 0.95$ |

TABLE 4-continued

| Layer | Target used | Deposition pressure | Gas |
|---|---|---|---|
| $SnZnO_x$ | 34:65:1 wt % SnZn:Sb | $2 \times 10^{-3}$ mbar | $Ar/(Ar + O_2) = 0.58$ |
| ZnO | 98:2 wt % Zn:Al | $2 \times 10^{-3}$ mbar | $Ar/(Ar + O_2) = 0.52$ |
| NiCr | 80:20 wt % NiCr | $2 \times 10^{-3}$ mbar | 100% Ar |
| Ag | Ag | $2 \times 10^{-3}$ mbar | 100% Ar |

The resistivity, optical and energy characteristics of these examples are given in table 5 below.

In these examples, the characteristics of the substrate coated with the multilayer coating are:

R, which indicates the sheet resistance of the multilayer coating in ohms per square;

$T_L$, which indicates the light transmission in the visible in % of the substrate coated with the multilayer coating, measured under illuminant $D_{65}$ at 2°;

$a_T^*$ and $b_T^*$, which indicate the colors a* and b* in transmission in the LAB system, measured under illuminant $D_{65}$ at 2°;

$R_c$, which indicates the light reflection in the visible in %, measured under illuminant $D_{65}$ at 2°, on the side of the substrate coated with the thin-film multilayer coating;

$a_c^*$ and $b_c^*$, which indicate the colors a* and b* in reflection in the LAB system, measured under illuminant $D_{65}$ at 2°, on the coated substrate side;

$R_g$, which indicates the light reflection in the visible in %, measured under illuminant $D_{65}$ at 2°, on the bare substrate side; and $a_g^*$ and $b_g^*$, which indicate the colors a* and b* in reflection in the LAB system, measured under illuminant $D_{65}$ at 2°, on the bare substrate side.

As previously, the factor g, or solar factor, in % (CEN standard) is considered in a 4-16 (90% Ar)-4 double-glazing configuration, with the thin-film multilayer coating on face 3, and the other substrate being a clear standard glass (PLANILUX from Saint-Gobain), as illustrated in FIG. 2.

TABLE 5

| Ex. | R | $T_L$ | g | $a_T^*$ | $b_T^*$ | $R_c$ | $a_c^*$ | $b_c^*$ | $R_g$ | $a_g^*$ | $b_g^*$ |
|---|---|---|---|---|---|---|---|---|---|---|---|
| 1 | 2.6 | 76.9 | 50.5 | −4 | 3.3 | 13 | 4.5 | −8.9 | 15.5 | 4.3 | −7.2 |
| 11 | 2.6 | 76.1 | 49.4 | −4.7 | 5.1 | 14.2 | 5.5 | −12.5 | 16.6 | 5.4 | −10.1 |

By comparing the optical and energy characteristics of table 5 above with the optical characteristics of table 3, good correspondence is observed from the standpoint of the differences between examples 1 and 11.

The optical characteristics obtained with the deposited multilayer coatings are not identical to those of the simulations given in table 3 since they are test coatings, which are not completely optimized, in particular as regards the thickness of the functional metallic layer actually deposited.

The multilayer coating of example 1 is a temperable coating within the context of the invention since the variation due to the heat treatment in the light transmission in the visible is less than 5 and even less than 3.

It is therefore difficult, when they are placed side by side, to distinguish a substrate according to example 1 that has undergone a substrate heat treatment from a substrate of this same example that has not undergone heat treatment respectively.

Furthermore, the mechanical strength of the multilayer coating according to the invention is very good thanks to the presence of the protective layer 69.

Moreover, the overall chemical resistance of this multilayer coating of example 1 is generally good.

The use of an Si:Zr-based layer (and a fortiori several such layers), as known from patent application EP 1 656 328 A2, also makes it possible for the high-refractive-index layer or layers in question to be deposited more rapidly and also enables very good temperability to be obtained, especially because of the very good compatibility of this kind of layer with the surrounding oxide or nitride layers.

Because of the large thickness of the silver layer (and therefore the low sheet resistance obtained) together with good optical properties (in particular the light transmission in the visible), it is also possible to use the substrate coated with the multilayer coating according to the invention to produce a transparent electrode substrate.

This transparent electrode substrate may be suitable for an organic light-emitting device, in particular by replacing the silicon nitride layer 66 of example 1 with a conducting layer (particularly one having a resistivity of less than 1 Ω·cm) and especially an oxide-based layer. This layer may for example be made of tin oxide or based on zinc oxide optionally doped with Al or Ga, or based on a mixed oxide and especially indium tin oxide ITO, indium zinc oxide IZO, tin zinc oxide SnZn optionally doped (for example with Sb or F). This organic light-emitting device may be used to produce a lighting device or a display device (screen).

In general, the transparent electrode substrate may be suitable for heating glazing, for any electrochromic glazing, for any display screen or else for a photovoltaic cell (or panel) and especially for the transparent rear face of a photovoltaic cell.

The present invention has been described above by way of example. Of course, a person skilled in the art is capable of producing various alternative forms of the invention without thereby departing from the scope of the patent as defined by the claims.

The invention claimed is:

1. A transparent substrate comprising, on a main face: a thin-film multilayer coating comprising a metallic functional layer having reflection properties in infrared and/or in solar radiation, or based on silver or a metal alloy containing silver, and two antireflection films, the antireflection films each comprising at least two dielectric layers, the functional layer being placed between the two antireflection films, the functional layer being optionally deposited directly on an underblocker film placed between the subjacent antireflection film and the functional layer and the functional layer being optionally deposited directly beneath an overblocker film placed between the functional layer and the superjacent antireflection film, wherein each antireflection film includes at least one high-refractive-index dielectric layer located in contact with or close to the functional layer and a total optical thickness $e_2$ of the high-refractive-index dielectric layer or of all of the high-refractive-index dielectric layers which is or are located in the subjacent antireflection film represents between 35 and 55% of the total optical thickness $e_{20}$ of this subjacent antireflection film, and the total optical thickness $e_6$ of the high-refractive-index dielectric layer or of all of the high-refractive-index dielectric layers which is or are located in the superjacent antireflection film represents between 10 and 60% of the total optical thickness $e_{60}$ of this superjacent antireflection film, wherein the physical thickness of all of the layers interposed between the high-refractive-index layer and the metallic functional layer does not exceed 10 nm and wherein the high refractive-index layer of the superjacent antireflective film is in direct contact with a first dielectric layer, which is not a high refractive-index layer, and the first dielectric layer is in direct contact with the functional layer or the optional overblocker film that is in direct contact with the functional layer, and wherein the high-refractive-index material of the high-refractive-index dielectric layers is predominantly in the dielectric film subjacent to the metallic functional layer such that the ratio $R=e_2/e_6$ of the total optical thickness $e_2$ of the high-refractive-index dielectric layer or of all of the high-refractive-index dielectric layers which is or are located in the subjacent antireflection film to the total optical thickness $e_6$ of the high-refractive-index dielectric layer or of all of the high-refractive-index dielectric layers which is or are located in the superjacent antireflection film is between 1.4 and 1.5 including these values.

2. The substrate of claim 1, wherein the constituent material of each high-refractive-index dielectric layer is chosen from: titanium oxide, niobium oxide, or silicon nitride doped with zirconium, or silicon nitride doped with zirconium and aluminum.

3. The substrate of claim 1, wherein the ratio E of the optical thickness $e_{20}$ in nm of the subjacent antireflection film to the optical thickness $e_{60}$ in nm of the superjacent antireflection film is such that: $0.4 \leq E \leq 0.9$.

4. The substrate of claim 1, wherein the subjacent antireflection film and the superjacent antireflection film each include at least one dielectric layer based on silicon nitride, or based on silicon nitride doped with at least one other element or with aluminum.

5. The substrate of claim 1, wherein the final layer or overcoat of the subjacent antireflection film, that furthest away from the substrate, is an oxide-based wetting layer, or is one based on zinc oxide, or is based on zinc oxide doped with at least one other element or with aluminum.

6. The substrate of claim 1, wherein the subjacent antireflection film includes at least one nitride-based dielectric layer, or is based on silicon nitride and/or aluminum nitride, and at least one noncrystalline smoothing layer made of a mixed oxide, the smoothing layer being in contact with a crystalline superjacent wetting layer.

7. The substrate of claim 1, wherein the final layer or overcoat of the superjacent antireflection film, that furthest away from the substrate, is based on an oxide.

8. The substrate of claim 1, wherein each high-refractive-index dielectric layer is independently selected from the group consisting of titanium oxide, niobium oxide, silicon nitride doped with zirconium and silicon nitride doped with zirconium and Al.

9. The substrate of claim 1, wherein the first dielectric layer is a zinc oxide layer.

10. The substrate of claim 1, wherein the total optical thickness $e_6$ of the high-refractive-index dielectric layer or of all of the high-refractive-index dielectric layers which is or are located in the superjacent antireflection film represents between 15 and 35% of the total optical thickness $e_{60}$ of this superjacent antireflection film.

11. The substrate of claim 1, wherein the overblocker layer is present, has a physical thickness from 0.2-1.8 nm, and comprises nickel or titanium.

12. The substrate of claim 1, having a LAB $a_{Rc}^*$ color reflection that is positive and less than 5 and a LAB $b_T^*$ color transmission that is positive and less than 4, wherein the $a_{Rc}^*$ and the $b_T^*$ are measured under illuminant $D_{65}$ at 2° on the opposite side of the substrate from the main face on which the thin-film multilayer coating is deposited.

13. A glazing incorporating at least one substrate of claim 1, optionally combined with at least one other substrate.

14. The glazing of claim 13, mounted as a monolithic unit, a double-glazing unit, a triple-glazing unit, or a laminated-glazing unit, wherein at least the substrate bearing the multilayer coating is bent and/or tempered.

15. The glazing of claim 13, mounted as a double-glazing unit, having a selectivity $S \geq 1.3$.

16. A transparent electrode of a heating glazing or an electrochromic glazing comprising the glazing of claim 13.

17. A lighting device, display device or photovoltaic panel comprising the glazing of claim 13.

* * * * *